United States Patent
Aliakseyeu et al.

(10) Patent No.: US 11,817,900 B2
(45) Date of Patent: Nov. 14, 2023

(54) VISIBLE LIGHT COMMUNICATION DETECTING AND/OR DECODING

(71) Applicant: SIGNIFY HOLDING B.V., Eindhoven (NL)

(72) Inventors: Dzmitry Viktorovich Aliakseyeu, Eindhoven (NL); Bartel Marinus Van De Sluis, Eindhoven (NL); Dirk Valentinus René Engelen, Heusden-Zolder (BE)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/464,799

(22) PCT Filed: Nov. 22, 2017

(86) PCT No.: PCT/EP2017/080019
§ 371 (c)(1),
(2) Date: May 29, 2019

(87) PCT Pub. No.: WO2018/099779
PCT Pub. Date: Jun. 7, 2018

(65) Prior Publication Data
US 2019/0319706 A1    Oct. 17, 2019

(30) Foreign Application Priority Data
Nov. 29, 2016 (EP) .................................... 16201065

(51) Int. Cl.
*H04B 10/00* (2013.01)
*H04B 10/116* (2013.01)
(Continued)

(52) U.S. Cl.
CPC ............ *H04B 10/116* (2013.01); *G01S 17/06* (2013.01); *G06F 16/24* (2019.01); *G06K 7/10564* (2013.01); *G06T 7/74* (2017.01)

(58) Field of Classification Search
CPC ................................ H04B 10/116; G06T 7/74
See application file for complete search history.

(56) References Cited

U.S. PATENT DOCUMENTS

| | | | |
|---|---|---|---|
| 6,400,482 B1* | 6/2002 | Lupton | H04B 10/1143 398/140 |
| 2005/0265731 A1* | 12/2005 | Keum | H04B 10/114 398/183 |

(Continued)

OTHER PUBLICATIONS

Romain Gallen, et al., "Nighttime Visibility Analysis and Estimation Method in the Presence of Dense Fog," IEEE Transactions on Intelligent Transportation Systems, vol. 16, No. 1, Feb. 2015 (11 Pages).

(Continued)

*Primary Examiner* — Pranesh K Barua

(57) ABSTRACT

A mobile system (1,11) comprises a camera (3) and at least one processor (5). The at least one processor is configured to capture an image with the camera, e.g. of a light beacon (15), to determine whether a certain object is recognized in the captured image, e.g. by querying a database (19), and to start detecting and/or decoding data being communicated via visible light in dependence on the certain object being recognized.

10 Claims, 6 Drawing Sheets

(51) Int. Cl.
*G06T 7/73* (2017.01)
*G06F 16/24* (2019.01)
*G01S 17/06* (2006.01)
*G06K 7/10* (2006.01)

(56) References Cited

U.S. PATENT DOCUMENTS

| | | | |
|---|---|---|---|
| 2007/0217795 A1* | 9/2007 | Otte | H04B 10/112 398/131 |
| 2008/0187318 A1* | 8/2008 | Osanai | H04B 10/116 398/129 |
| 2012/0121271 A1* | 5/2012 | Wood | H04B 10/1121 398/118 |
| 2012/0170947 A1* | 7/2012 | Kim | H04B 10/116 398/202 |
| 2013/0016978 A1* | 1/2013 | Son | H04B 10/116 398/118 |
| 2013/0251374 A1* | 9/2013 | Chen | H04B 10/1141 398/118 |
| 2014/0126911 A1* | 5/2014 | Jovicic | H04J 14/02 398/116 |
| 2014/0321859 A1* | 10/2014 | Guo | H04B 10/116 398/118 |
| 2014/0354846 A1* | 12/2014 | Muguruma | H04N 25/70 348/222.1 |
| 2015/0010308 A1* | 1/2015 | Uedaira | H04B 10/116 398/106 |
| 2015/0146871 A1* | 5/2015 | Liu | H04L 9/12 380/256 |
| 2015/0200788 A1 | 7/2015 | Thomas et al. | |
| 2016/0099774 A1* | 4/2016 | Sim | H04B 10/00 398/115 |
| 2016/0117896 A1 | 4/2016 | Steiner et al. | |
| 2016/0139244 A1 | 5/2016 | Holtman | |
| 2016/0191159 A1* | 6/2016 | Aoyama | H04B 10/116 398/172 |
| 2016/0364788 A1* | 12/2016 | Jo | G06T 19/006 |
| 2017/0363462 A1* | 12/2017 | Armstrong | G01J 1/04 |
| 2018/0076891 A1* | 3/2018 | Agrawal | H04W 4/02 |
| 2018/0091221 A1* | 3/2018 | Bitra | H04N 5/232 |
| 2018/0098215 A1* | 4/2018 | Roberts | H04N 7/183 |
| 2019/0033079 A1* | 1/2019 | Wang | H04B 10/116 |

OTHER PUBLICATIONS

Yi-Yuan Chen, et al., "Robust Light Objects Recognition Based on Computer Vision," 10th International Symposium on Pervasive Systems, Algorithms, and Networks, 2009 (7 Pages).
Ye-Sheng Kuo, et al., "Luxapose: Indoor Positioning With Mobile Phones and Visible Light," Mobicom, 2014 (12 Pages).

* cited by examiner

VISIBLE LIGHT COMMUNICATION DETECTING AND/OR DECODING

CROSS-REFERENCE TO PRIOR APPLICATIONS

This application is the U.S. National Phase application under 35 U.S.C. § 371 of International Application No. PCT/EP2017/080019, filed on Nov. 22, 2017, which claims the benefit of European Patent Application No. 16201065.6, filed on Nov. 29, 2016. These applications are hereby incorporated by reference herein.

FIELD OF THE INVENTION

The invention relates to a mobile system for visible light communication detecting and/or decoding.

The invention further relates to a method of visible light communication detecting and/or decoding.

The invention also relates to a computer program product enabling a computer system to perform such a method.

BACKGROUND OF THE INVENTION

Visible Light Communication (VLC) is a technology for communicating data via visible light, e.g. using fluorescent lamps or LEDs. The paper "Luxapose: Indoor Positioning with Mobile Phones and Visible Light" by Kuo et al., published on pages 447-458 of the MobiCom '14 Proceedings of the 20th annual international conference on Mobile computing and networking in September 2014, discloses a method for VLC-based indoor positioning. The method involves determining the location of a camera-equipped smartphone with the help of LED luminaires that transmit identifiers and/or locations encoded in human-imperceptible optical pulses. The camera-equipped smartphone is an unmodified smartphone whose exposure and ISO settings are changed in order to detect and decode the transmitted visible light data.

The paper "Robust Light Objects Recognition Based on Computer Vision" by Yi-Yuan Chen et al. discloses a method for recognizing a location of light objects in images, which uses the basis of geometric arrangements and the blinking frequency of light objects, along with image processing techniques to recognize the state and positions of light objects quickly.

A drawback of the method disclosed in the Luxapose paper is that the camera always needs to be on and use special settings when data might be transmitted using visible light and that the camera can therefore not be optimally used for other applications, e.g. capturing a photo to be shared with others, as the exposure and ISO settings are not optimal for these applications.

SUMMARY OF THE INVENTION

It is a first object of the invention to provide a mobile system, which is able to detect and/or decode visible light communication while using less resources for this application.

It is a second object of the invention to provide a method of visible light communication detection and/or decoding, which reduces the resource usage of detecting and/or decoding visible light communication.

In a first aspect of the invention, the mobile system configured to detect data being communicated via visible light emitted by a light source, which mobile system comprises a camera and at least one processor configured to capture an image with said camera, to determine whether a certain object, e.g. a certain object comprising a light source, is recognized in said captured image and to start detecting (and/or decoding) said data only after said certain object has been recognized. The mobile system may comprise a single device, e.g. a camera-equipped smartphone, or multiple devices, e.g. a pair of smart glasses communicating with a smart phone using short range communication. The certain object may be a light source, may be an object of which a light source is one of its parts, or may comprise one or more fiducial markers, for example.

The inventors have recognized that by only detecting and/or decoding a VLC signal when a certain object, e.g. an object which might transmit data via visible light, is recognized in a captured image, these tasks consume less power than when the detecting and/or decoding would be performed continuously. Furthermore, the camera may now be usable for other applications, e.g. e.g. augmented reality and/or capturing a photo to be shared with others, and if a further sensor is used for receiving VLC signals, this further sensor does not need to be switched on all the time. When the camera is being used (almost) continuously anyway, e.g. for an augmented reality application, VLC signal detection and decoding may be implemented without significant additional resources.

Even if the detection of VLC signals would be performed continuously, by only decoding a VLC signal when a certain object is recognized in a captured image, this task also consumes less power than when the decoding would be performed continuously. For example, access control may prohibit the mobile system from obtaining protocol information and/or a decryption key needed to decode a VLC signal. In this case, the mobile system cannot (fully) decode the VLC signal and the at least one processor will therefore consume less resources.

Said at least one processor may be configured to activate a further sensor to start detecting whether data is being communicated via visible light upon determining that said certain object is recognized. It may be advantageous to use a further sensor for receiving VLC signals, e.g. a second camera or a photo diode, and to (continue to) use the camera that captured the image for other applications, e.g. augmented reality and/or capturing a photo to be shared with others. Power consumption is reduced if the further sensor does not need to be active continuously.

Said at least one processor may be configured to monitor whether a signal received from said further sensor comprises data communicated via visible light and to deactivate said further sensor upon determining that said signal does not comprise data communicated via visible light. To reduce power consumption, it is beneficial to deactivate the further sensor when it is likely that the further sensor is no longer needed. When the signal does not comprise data communicated via visible light, it may be assumed that the further sensor is no longer needed at the moment. Alternatively, the further sensor may be deactivated when the camera no longer captures an image that comprises a recognized object, but this is less beneficial when the further sensor has a wider view than the camera. Use of a further sensor that has a wider view than the camera is beneficial when a single captured image does not comprise the entire relevant VLC signal. When the VLC signal needs to be received for a certain amount of time (after which it is repeated), a further sensor with a wider view makes it easier to receive this VLC signal.

Said at least one processor may be configured to change a setting of said camera to start detecting whether data is being communicated via visible light upon determining that said certain object is recognized. Use of a conventional smartphone camera, as disclosed in the Luxapose paper, whose CMOS imager typically provides a rolling shutter effect that may be used to detect and decode VLC data, may result in a lower cost and/or may ensure that the camera may also be usable for other applications. However, the settings of the camera may have to be different than normal in view of the frequency of the VLC signal. By reverting to previous settings of the camera when it is no longer likely that a VLC signal will be received, the camera may be used for other applications with settings optimal for those other applications.

Said at least one processor may be configured to detect from said captured image, from another image captured by said camera and/or from a signal received from a further sensor whether data is being communicated via visible light. For example, a camera and camera settings may be used that capture images in which objects may be recognized and VLC signals may be detected as well. Only when a certain object is recognized in a captured image will this captured image be analyzed for the presence of a VLC signal. If camera settings are used that result in captured images in which objects are recognizable, but VLC signals are not detectable, another image may need to be captured with different camera settings in order to detect and decode the VLC signal. If the camera is not suitable for detecting VLC signals with any settings or the camera needs to keep certain settings for another application, a further sensor may be used.

Said at least one processor may be configured to query a remote database in order to determine whether a certain object is recognized in said captured image. Although it may be possible to store on the mobile system itself the characteristics of one or more objects that are associated with, e.g. transmit, a VLC signal, it is beneficial to use a remote database if the collection of objects is large and/or (relatively) dynamic. Furthermore, a remote database makes access control, e.g. whether the mobile system is allowed to decode the VLC signal or whether the mobile system's user is allowed to view the decoded VLC signal, easier to implement. It is in this case not required that the mobile system is trustworthy.

Said at least one processor may be configured to provide information to said remote database which allows said remote database to determine what information to provide to said mobile system in relation to a certain object recognized in said captured image. The at least one processor may be configured to provide a user identifier, group identifier and/or passcode to the remote database, for example. The information provided to the mobile system by the remote database may depend on the information received from the mobile system. For example, protocol information and/or a decryption key may only be provided to the mobile system if the user identifier and/or group identifier are in, respectively, a list of user identifiers and/or a list of group identifiers associated with the certain object recognized in the captured image. The protocol information and/or the decryption key may only be provided to the mobile system if the mobile system provides a/the correct passkey, for example.

Said at least one processor may be configured to obtain protocol information associated with said certain object recognized in said captured image and to decode at least part of said data communicated via visible light using said obtained protocol information. The protocol information may define, for example, how bits of a VLC signal should be decoded into usable information. For example, when a Manchester-encoded VLC signal has been decoded, this results in a number of bits, but the meaning of the bits may be interpretable in different ways (e.g. the bits may form a text message or an URL or the bits may form a GPS location). By not using the same protocol information for all light sources/beacons, i.e. on all received VLC signals, the mobile system may be able to work with many different kinds of light sources/beacons.

Said at least one processor may be configured to obtain a decryption key associated with said certain object recognized in said captured image and to decode at least part of said data communicated via visible light using said obtained decryption key. For example, when a Manchester-encoded VLC signal has been decoded, this results in a number of bits, but the bits may form an encrypted message to allow only authorized mobile systems/users in possession of the decryption key to decode/view it.

Said at least one processor may be configured to obtain region information associated with said certain object recognized in said captured image, said region information identifying a region of said recognized object, and to analyze only said region of said recognized object in a captured image to detect and/or decode said data being communicated via visible light. This simplifies the detecting and/or decoding of the VLC signal and may reduce the at least one processor's power consumption.

Said at least one processor may be configured to capture a further image with said camera, to determine whether a certain object is recognized in said captured further image and to stop detecting data being communicated via visible light upon determining that a certain object is not recognized in said captured further image. As long as an object that is recognized as transmitting a VLC signal is in the camera's view, the decoding and/or detecting of the data being communicated via visible light may be continued. Different information (e.g. different protocol or region information) may be associated with different objects, so if a different object is recognized in a second captured image than in a first captured image, different information may need to be obtained at that moment.

Said at least one processor may be configured to recognize a certain object in said captured image by recognizing a certain shape or a certain pattern associated with a certain object in said captured image. Objects may be recognized by using conventional object recognition techniques which include edge detection followed by shape detection. New VLC signal emitting light beacons may be manufactured with a special shape (e.g. of a luminaire or a light source) that is already part of a database of VLC signal emitting light beacons. This database of VLC signal emitting light beacons may also include shapes associated with existing VLC signal emitting light beacons, e.g. shapes of certain existing models of light sources and/or luminaires. Alternatively or additionally, certain patterns (e.g. sequences of colors, dots and/or lines) that are easily discernable may allow the objects to be (easily) recognized. These patterns may be special patterns applied or attached to new VLC signal emitting light beacons or may be patterns discernable on existing VLC signal emitting light beacons.

In a second aspect of the invention, the method of visible light communication detecting (and/or decoding) comprises capturing an image with a camera, determining whether a certain object is recognized in said captured image, and starting detecting (and/or decoding) data being communicated via visible light emitted by a light source only after said certain object has been recognized. The method may be implemented in hardware and/or software.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: capturing an image with a camera, determining whether a certain object is recognized in said captured image, and starting detecting (and/or decoding) data being communicated via visible light emitted by a light source only after said certain object has been recognized.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
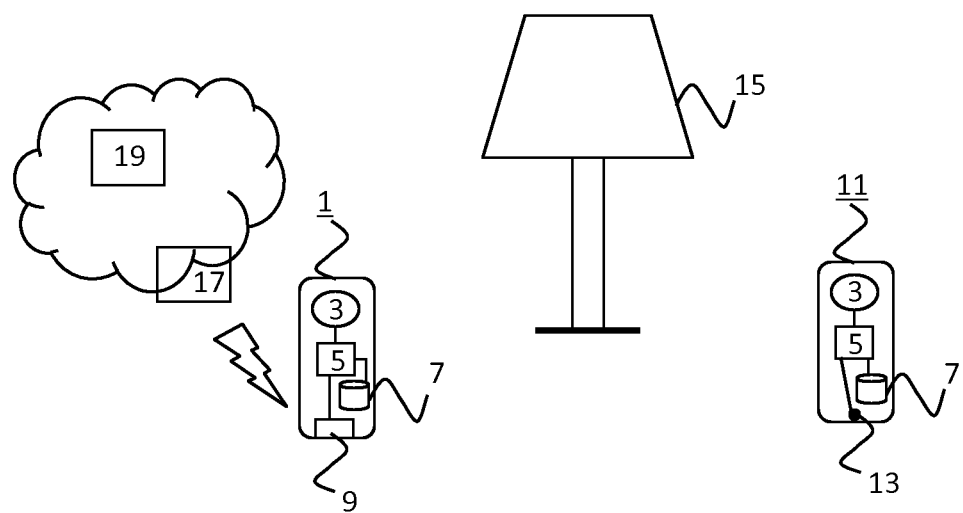
FIG. 1 is a block diagram of embodiments of the mobile system of the invention.

FIG. 1 shows two embodiments of the mobile system of the invention: a mobile system 1 and a mobile system 11. Mobile systems 1 and 11 comprises a camera 3 and a processor 5. The processor 5 is configured to capture an image with the camera 3, to determine whether a certain object, e.g. a light beacon 15, is recognized in the captured image and to start detecting and/or decoding data being communicated via visible light in dependence on the certain object being recognized.

The processor 5 may be configured to detect from the captured image, from another image captured by the camera 3 and/or from a signal received from a further sensor, e.g. from a further camera, whether data is being communicated via visible light. A camera sensor reads a lot of pixels, typically at a low rate (e.g. 25 frames per second). But visible light communication should be invisible for the eye, and emitted at a much higher rate (200 Hz or higher even to MHz). In order to detect the fluctuations with a camera, a special camera may be used, e.g. camera that uses a combination of slow camera pixels interlaced with fast diode pixels. The camera pixels detect the location of a fast fluctuating light source. The diode pixels then read out the sensed fluctuations at a high speed. It may also be possible to use an existing rolling shutter camera, which is a common type of camera in smartphones. With the rolling shutter camera, there is a small delay between the read out of the different rows. This means that a fast fluctuating source (or light effect), delivers a different intensity on the camera row, resulting in black and white stripes. When taking a picture, the camera processing might compensate for this.

Mobile systems 1 and 11 may be mobile phones, e.g. smart phones, for example. In the embodiments shown in FIG. 1, mobile systems 1 and 11 both comprise a single device. In a different embodiment, a mobile system may comprise a plurality of devices, e.g. a smartphone may comprise processor 5 and a pair of smart glasses may comprise camera 3.

The processor 5 of the mobile system 1 is configured to change a setting of the camera 3 to start detecting whether data is being communicated via visible light upon determining that the certain object is recognized. The setting may be changed to the setting described in the Luxapose paper, for example. Mobile system 1 comprises a communication interface 9. The processor 5 of the mobile system 1 is configured to use the communication interface 9 to query a remote database 19 in order to determine whether a certain object is recognized in the captured image.

When the light beacon 15 is connected to a wired or wireless network (not shown), the light beacon 15 may be informed that its VLC signal is being detected and/or decoded by a mobile system, e.g. informed by the mobile system itself. The light beacon 15 may then alter the color of its light source, for example, as an indication to a user of the mobile system that he may want to point his mobile system in the direction of the light beacon 15, for example. The mobile system may inform the light beacon 15 using ZigBee, Bluetooth or Wi-Fi, for example.

The processor 5 of the mobile system 1 may be configured to use the communication interface 9 to provide information to the remote database 19, e.g. a passkey, user identifier and/or group identifier, which allows the remote database 19 to determine what information to provide to the mobile system 1 in relation to a certain object recognized in the captured image, e.g. in view of access control. Mobile system 1 comprise storage means 7. Storage means 7 may store the captured image and/or further data and programs used by mobile system 1, for example.

Mobile system 11 further comprises a further sensor 13. The processor 5 of the mobile system 11 is configured to activate the further sensor 13 to start detecting whether data is being communicated via visible light upon determining that the certain object is recognized. The further sensor 13 may have a wider view than the camera 3. The further sensor 13 may comprise a further camera or a photo diode, for example. The further camera may be, for example, the camera described in "LED and CMOS Image Sensor Based Optical Wireless Communication System for Automotive Applications", Takai et al., IEEE Photonics Journal Volume 5, Number 5, October 2013.

The processor 5 of the mobile system 11 may be configured to monitor whether a signal received from the further sensor 13 comprises data communicated via visible light and to deactivate the further sensor 13 upon determining that the signal does not comprise data communicated via visible light. Mobile system 11 comprises storage means 7. Storage means 7 may store the captured image, a database with objects which might transmit VLC signals, and/or further data and programs used by the mobile system 11, for example. Mobile system 11 may comprise a communication interface (not shown), e.g. a communication interface similar to communication interface 9 of mobile system 1.

In the embodiment shown in FIG. 1, the mobile systems 1 and 11 comprise one processor 5. In an alternative embodiment, the mobile system comprises multiple processors. The processor 5 of the mobile systems 1 and 11 may be a general-purpose processor, e.g. from ARM or Qualcomm, or an application-specific processor. The processor 5 of the group controller 9 may run an iOS, Windows or Android operating system for example. The invention may be implemented using a computer program running on one or more processors.

The communication interface 9 of mobile system 1 may use WiFi, GPRS, EDGE, UMTS, LTE and/or 5G technologies to communicate with a base station 17 of a communication network, for example. The base station 17 may be part of a mobile communication network or of a local area network, for example. The base station 17 may be connected (directly or via other components) to the Internet. The mobile systems 1 and 11 may comprise other components typical for a mobile system, e.g. a battery and a display. The external database 19 may be a server, e.g. a web server, located on the Internet, for example.

In an embodiment, the processor 5 is configured to obtain protocol information associated with the certain object recognized in the captured image and to decode at least part of the data communicated via visible light using the obtained protocol information. In a different or in the same embodiment, the processor 5 is configured to obtain a decryption key associated with the certain object recognized in the captured image and to decode at least part of the data communicated via visible light using the obtained decryption key.

In an embodiment, the processor 5 is configured to obtain region information associated with the certain object recognized in the captured image, the region information identifying a region of the recognized object, and to analyze only the region of the recognized object in a captured image to detect and/or decode the data being communicated via visible light.

In an embodiment, the processor 5 is configured to capture a further image with the camera 3, to determine whether a certain object is recognized in the captured further image and to stop detecting data being communicated via visible light upon determining that a certain object is not recognized in the captured further image.

In an embodiment, the processor 5 is configured to recognize a certain object in the captured image by recognizing a certain shape or a certain pattern associated with a certain object in the captured image.

Figure 2:
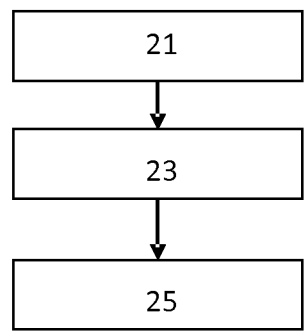
FIG. 2 is a flow diagram of the method of the invention.

The method of visible light communication detecting and/or decoding of the invention comprises at least three steps, see FIG. 2. A step 21 comprises capturing an image with a camera. A step 23 comprises determining whether a certain object is recognized in the captured image. A step 25 comprises detecting and/or decoding data being communicated via visible light in dependence on the certain object being recognized. In an embodiment, an intermediate step between steps 23 and 25 may involve informing the user that a certain object or the certain object has been detected and asking the user whether detecting and/or decoding should commence. In this embodiment, step 25 is performed if the user indicates that detecting and/or decoding should commence. In the same or in a different embodiment, the recognized object is displayed separate from or without other image elements or is highlighted in the captured image. This may make a user aware of the recognized object and if the data being communicated via visible light is (expected to be) important, he might decide to stop to insure that the VLC signal remains in view of the camera or in view of a further sensor, for example. This may be done as part of the above-mentioned intermediate step, for example.

Figure 7:
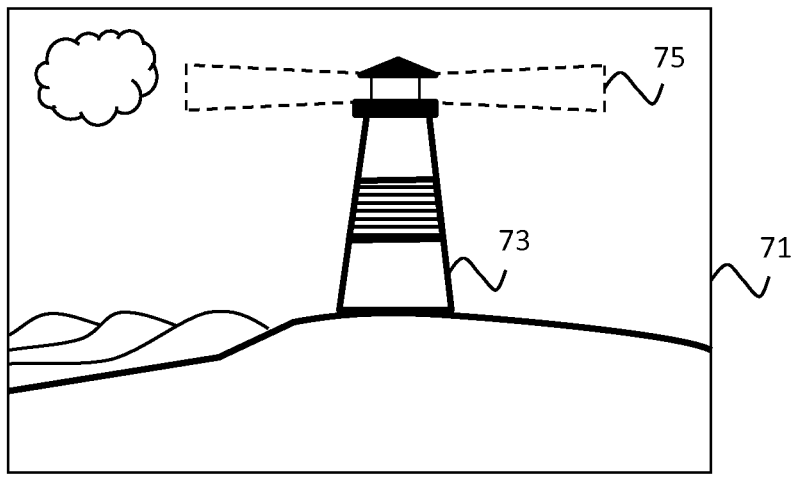
FIG. 7 shows an example of a captured image to illustrate the method of the invention.
Figure 8:
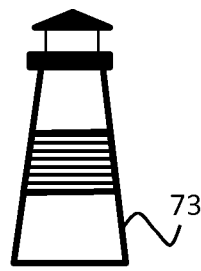
FIG. 8 shows an example of a recognized object to illustrate the method of the invention.

An example of a captured image is shown in FIG. 7. The captured image 71 shows a light house 73 emitting a light beam 75. An image of the light house 73 or one or more features (e.g. the shape) of the light house 73 may be stored in a database with objects that might transmit VLC signals, for example. In step 23, the light house 73 may be recognized as light beacon in the captured image 71, as shown in FIG. 8, for example.

Figure 3:
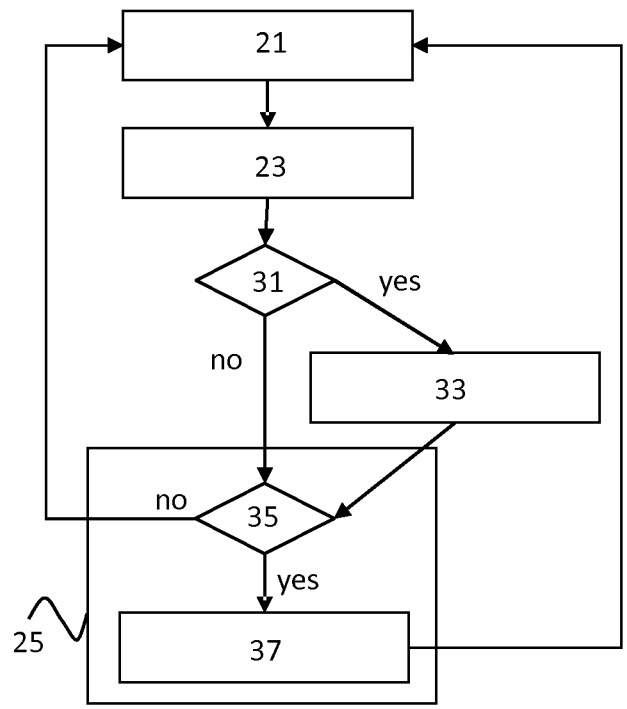
FIG. 3 is a flow diagram of a first embodiment of the method of the invention.

In a first embodiment of the method, steps 21 and 23 are followed by a step 31, see FIG. 3. Step 31 comprises determining whether region information has been associated with the recognized object. If region information has been associated with the recognized object, a step 33 is performed. After step 33, step 35 is performed. If no region information has been associated with the recognized object, step 33 is skipped.

Figure 9:
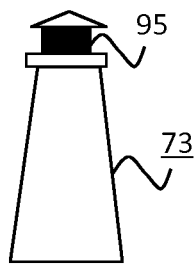
FIG. 9 shows an example of a region of a recognized object to illustrate the embodiment of the method of FIG. 3.

Step 33 comprises obtaining region information associated with the certain object recognized in the captured image. The region information identifies a region of the recognized object, preferably a light source of a light beacon. FIG. 9 shows an example of a light house 73, which is recognized as a light beacon, with a region 95 corresponding to the light source of the light house 73.

In the embodiment of FIG. 3, step 25 (see FIG. 2) comprises steps 35 and 37. Step 35 comprises analyzing only the region 95 of the recognized object, i.e. the light house 73, in the captured image 71 to detect data being communicated via visible light. If such data is detected, step 37 is performed next. Step 37 comprises decoding this data. If no such data is detected, the method returns to step 21 instead of proceeding to step 37. After step 37 has been performed, the method returns to step 21.

Figure 4:
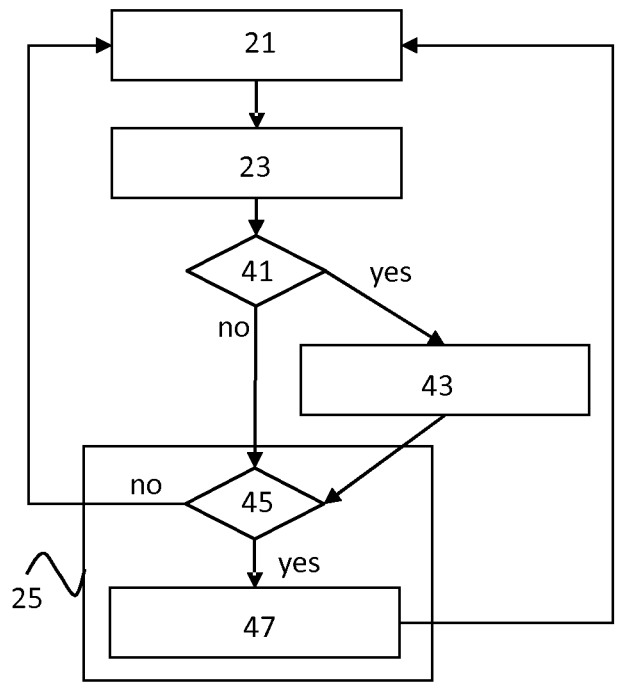
FIG. 4 is a flow diagram of a second embodiment of the method of the invention.

In a second embodiment of the method, steps 21 and 23 are followed by a step 41, see FIG. 4. Step 41 comprises determining whether protocol information has been associated with the recognized object. If protocol information has been associated with the recognized object, a step 43 is performed. Step 43 comprises obtaining the protocol information associated with the recognized object. After step 43, step 45 is performed. If no protocol information has been associated with the recognized object, step 43 is skipped.

In the embodiment of FIG. 4, step 25 (see FIG. 2) comprises steps 45 and 47. Step 45 comprises analyzing the captured image to detect data being communicated via visible light. If such data is detected, step 47 is performed next. Step 47 comprises decoding this data. If protocol information was obtained in step 43, this protocol information is used to decode the data being communicated via visible light. If no such data is detected in step 45, the method returns to step 21 instead of proceeding to step 47. After step 47 has been performed, the method returns to step 21.

Figure 5:
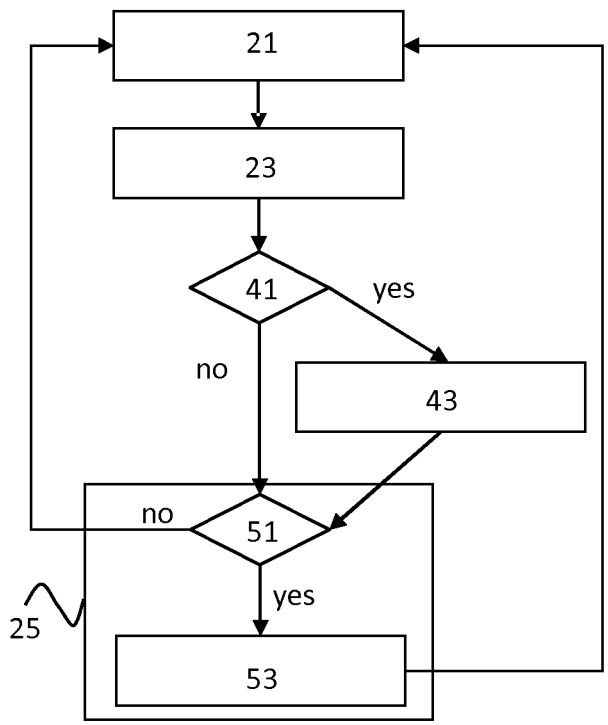
FIG. 5 is a flow diagram of a third embodiment of the method of the invention.

In a third embodiment of the method, see FIG. 5, steps 21, 23, 41 and 43 are the same as in the second embodiment, but step 25 comprises steps 51 and 53 instead of steps 45 and 47. Step 51 comprises detecting data being communicated via visible light with a further sensor, e.g. a photo diode or a camera dedicated to VLC signal reception. If such data is detected, step 53 is performed next. Step 53 comprises decoding the data detected in step 51 with the further sensor. If protocol information was obtained in step 43, this protocol information is used to decode the data being communicated via visible light. If no such data is detected in step 51, the method returns to step 21 instead of proceeding to step 53. After step 53 has been performed, the method returns to step 21.

Figure 6:
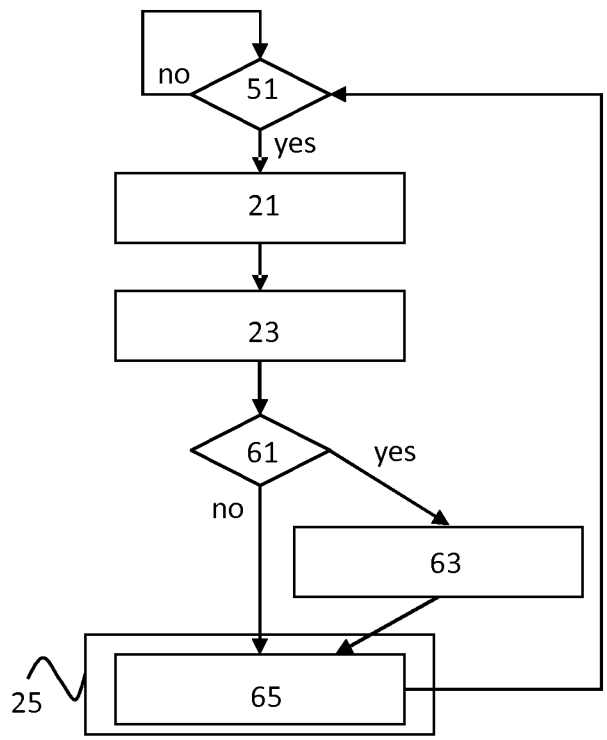
FIG. 6 is a flow diagram of a fourth embodiment of the method of the invention.

In a fourth embodiment of the method, steps 21 and 23 are preceded by a step 51, see FIG. 6. Step 51 comprises detecting with a further sensor, e.g. a photo diode, whether data is being communicated via visible light. In this embodiment, the further sensor may be continuously active, for example. Steps 21 and 23 are performed if data being communicated via visible light is detected in step 51. If no such data is detected, step 51 is repeated.

Steps 21 and 23 are followed by a step 61. Step 61 comprises determining whether a decryption key has been associated with the recognized object. If a decryption key has been associated with the recognized object, a step 63 is performed. Step 63 comprises obtaining the decryption key associated with the recognized object. After step 63, step 65 is performed. If no protocol information has been associated with the recognized object, step 63 is skipped.

In the embodiment of FIG. 6, step 25 (see FIG. 2) comprises a step 65. Step 65 comprises decoding the data detected in step 51 with the further sensor. If a decryption key was obtained in step 63, this key is used to decode the data being communicated via visible light in step 65. After step 65 has been performed, the method returns to step 51.

Figure 10:
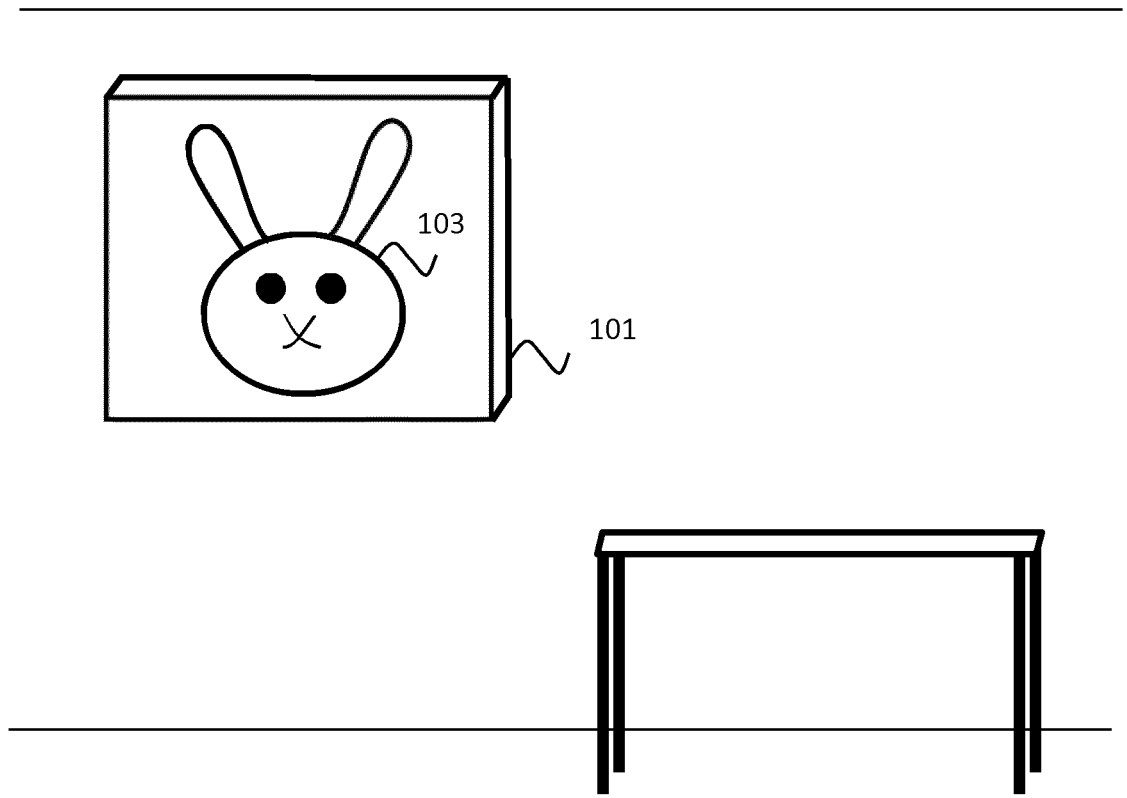
FIG. 10 shows an example of a light beacon that comprises a recognizable light source.

In the example of the captured image 71 shown in FIG. 7, the recognized object is itself not a light source. It may alternatively or additionally be possible to recognize light sources of light beacons. For example, a lamp 101 comprises a light source 103 with the shape of a bunny head, see FIG. 10. The shape of this light source 103 may be recognizable.

Figure 11:
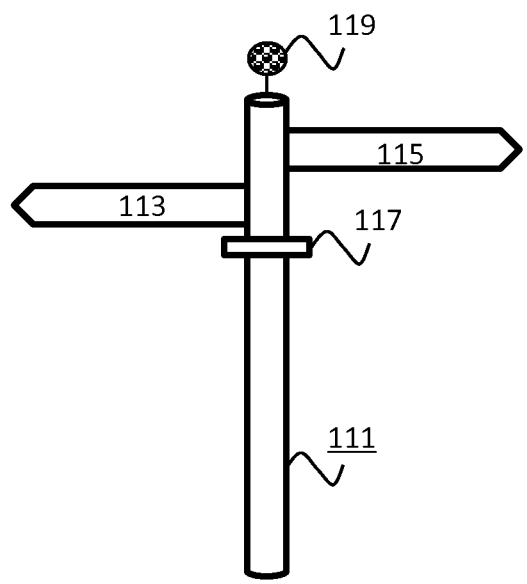
FIG. 11 shows an example of a light beacon that comprises a recognizable pattern.

Instead of or in addition to recognizing a certain shape associated with a certain object, a certain pattern or texture associated with a certain object may be recognized. For example, a city info sign 111 may comprise a top part 119 with a certain pattern or logo, see FIG. 11. The city info sign 111 further comprises route indicators 113 and 115 and a light source 117 which transmits VLC signals.

Figure 12:
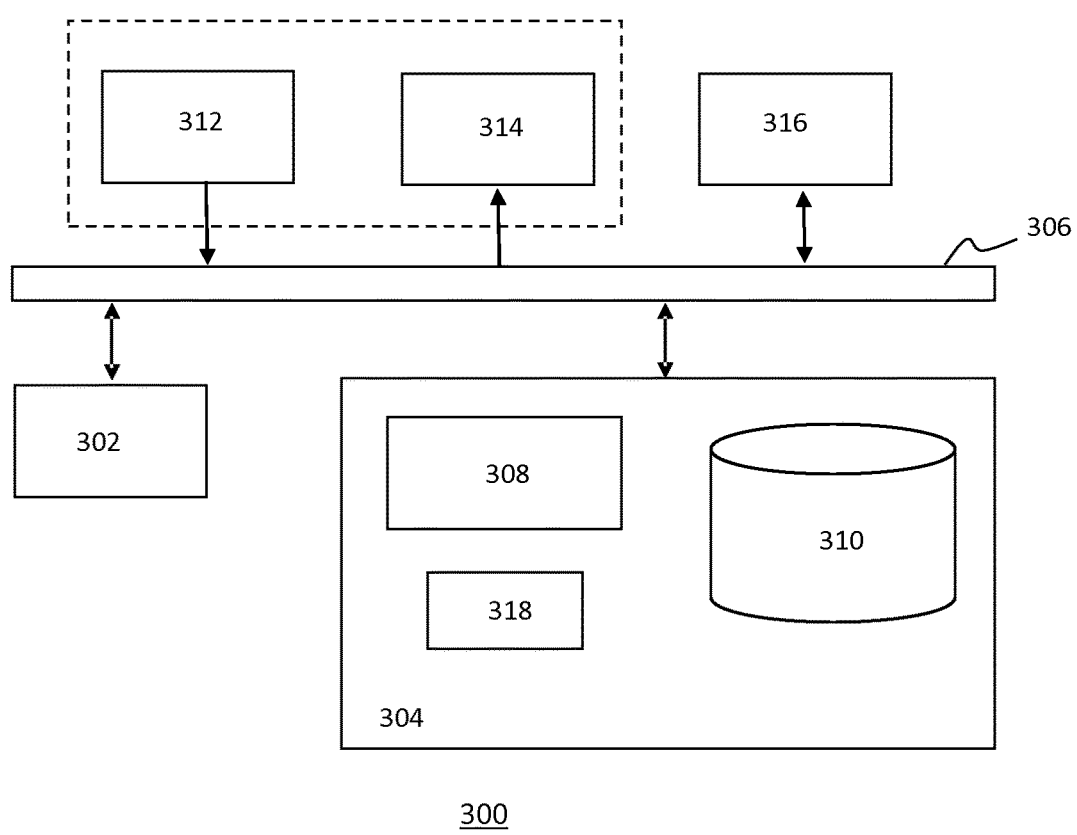
FIG. 12 is a block diagram of an exemplary data processing system for performing the method of the invention.

FIG. 12 depicts a block diagram illustrating an exemplary data processing system that may perform the method as described with reference to FIGS. 2 to 6.

As shown in FIG. 12, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 12, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 12) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A mobile system configured to detect data communication via visible light emitted by a light source, the mobile system comprising:
    a camera; and
    at least one processor configured to capture an image with said camera, to determine whether any object of a plurality of objects is recognized in said captured image and to start detecting whether data is being communicated via visible light associated with any object of the plurality of objects, regardless of which object of the plurality of objects is recognized in said captured image by the at least one processor, only after said recognized object has been recognized, to obtain a decryption key associated with said recognized object, to change a setting of said camera to start said detecting whether data is being communicated via visible light in response to determining that said recognized object is recognized, to decode at least part of said data which is communicated via visible light using said obtained decryption key, to activate a further sensor to start said detecting of whether data is being communicated in response to determining that said recognized object is recognized, and to monitor whether a signal received from said further sensor comprises data communicated via visible light and to deactivate said further sensor in response to determining that said signal does not comprise data communicated via visible light, said further sensor having a wider view than said camera.

2. The mobile system as claimed in claim 1, wherein said at least one processor is configured to provide information to a remote database which allows said remote database to determine what information to provide to said mobile system in relation to the recognized object.

3. The mobile system as claimed in claim 1, wherein said at least one processor is configured to obtain protocol information associated with said recognized object and to decode at least part of said data which is communicated via visible light using said obtained protocol information.

4. The mobile system as claimed in claim 1, wherein said at least one processor is configured to obtain region information associated with said recognized object, said region information identifying a region of said recognized object, and to analyze only said region of said recognized object in the captured image to detect and/or decode said data which is being communicated via visible light.

5. The mobile system as claimed in claim 1, wherein said at least one processor is configured to capture a further image with said camera, to determine whether the recognized object is recognized in said captured further image and to stop detecting data being communicated via visible light in response to determining that the recognized object is not recognized in said captured further image.

6. The mobile system as claimed in claim 1, wherein said at least one processor is configured to determine whether any object of a plurality of objects is recognized in said captured image by recognizing a certain shape or a certain pattern associated with the recognized object in said captured image.

7. A method of visible light communication detecting, comprising:
    capturing an image with a camera;
    determining whether any object of a plurality of objects is recognized in said captured image;
    starting detecting whether data is being communicated via visible light emitted by a light source associated with any object of the plurality of objects, regardless of which object of the plurality of objects is recognized in said captured image by said determining, only after said recognized object has been recognized;
    changing a setting of said camera to start said detecting whether data is being communicated via visible light in response to determining that said recognized object is recognized;
    activating a further sensor to start said detecting whether data is being communicated via visible light communication in response to determining that said recognized object is recognized, said further sensor having a wider view than said camera, and
    monitoring whether a signal received from said further sensor comprises data communicated via visible light, and deactivating said further sensor in response to determining that said signal does not comprise data communicated via visible light.

8. A non-transitory computer readable medium comprising at least one software code portion, the software code portion, when run on a computer system, being configured for causing the computer system to perform the method of claim 7.

9. The mobile system as claimed in claim 7, wherein said at least one processor is configured to determine whether any object of a plurality of objects is recognized in said captured image by querying a remote database.

10. The method as claimed in claim 7, wherein the determining whether any object of a plurality of objects is recognized in said captured image is implemented by querying a remote database.

* * * * *